Feb. 4, 1969 J. S. BAYNARD, JR 3,426,218

PULSE GENERATOR EMPLOYING TWO SEQUENTIALLY GATED MONOSTABLE MULTIVIBRATORS AND DELAY CIRCUIT

Filed April 8, 1966

INVENTOR.

J. S. Baynard, Jr.,

BY S. Gundersen

ATTORNEY

United States Patent Office 3,426,218
Patented Feb. 4, 1969

3,426,218

PULSE GENERATOR EMPLOYING TWO SEQUENTIALLY GATED MONOSTABLE MULTIVIBRATORS AND DELAY CIRCUIT

Joseph S. Baynard, Jr., Burlington, N.C., assignor to Western Electric Company, Incorporated, New York, N.Y., a corporation of New York Filed Apr. 8, 1966, Ser. No. 541,273
U.S. Cl. 307—265 3 Claims
Int. Cl. H03k 1/14

ABSTRACT OF THE DISCLOSURE

A delay pulse generator includes two serially connected monostable trigger circuits wherein the trailing edge of the pulse from the first trigger circuit actuates the second trigger circuit. Circuitry is provided for rendering the duration of actuation of the second trigger circuit independent of the magnitude or length of the pulse from the first trigger circuit.

This invention relates to a pulse generating circuit and, more particularly, to a circuit for producing a variable length output pulse at a predetermined time after an input pulse.

One commonly used pulse generator circuit employs two serially connected monostable trigger circuits wherein a pulse from the first trigger circuit is applied to a capacitor coupled to an active element in the second trigger circuit. The pulse charges the capacitor and on the trailing edge of the pulse, a voltage dependent upon the charge on the capacitor is applied to the active element to trigger the second trigger circuit. The duration that the second trigger circuit is excited depends upon the time required for the charge on the capacitor to discharge through a resistance. When a pulse of short time duration is applied to the capacitor, the capacitor does not fully charge, and thus, the length of an output pulse produced during the excitation of the second trigger circuit is undersirably dependent upon the length of the pulse from the first trigger circuit. For pulses from the first trigger circuit of even shorter time duration, the voltage applied to the active element on the trailing edge of the pulse may be insufficient to trigger the second trigger circuit.

An object of the present invention is a pulse generator circuit having improved characteristics.

Another object of the present invention is a pulse generator circuit wherein the length of the output pulse is independent of the delay between the input pulse and the output pulse.

A further object of the invention is a pulse generator wherein the duration of delay between an input and an output pulse may be varied from long durations to very short durations without changing the duration of the output pulse.

A further object of the invention is an improved pulse monostable trigger circuit to produce an output pulse; from a first monostable trigger circuit triggers a second monostable trigger circuit to produce an output pulse; the improvement rendering the duration of excitation of the second monostable trigger circuit independent of the length of the pulse from the first monostable trigger circuit.

With these and other objects in view, the present invention employs a conventional delay circuit wherein the trailing edge of the pulse from a first monostable trigger circuit triggers a second monostable trigger circuit to produce a delayed output pulse. Circuitry precharges a timing capacitor in the second trigger circuit prior to the application of the pulse from the first trigger circuit to the second trigger circuit to render the excitation time of the second trigger circuit independent of the length of the pulses from the first trigger circuit.

A complete understanding of this invention may be had by reference to the following detailed description when considered in conjunction with the accompanying drawings, wherein.

Figure 1:
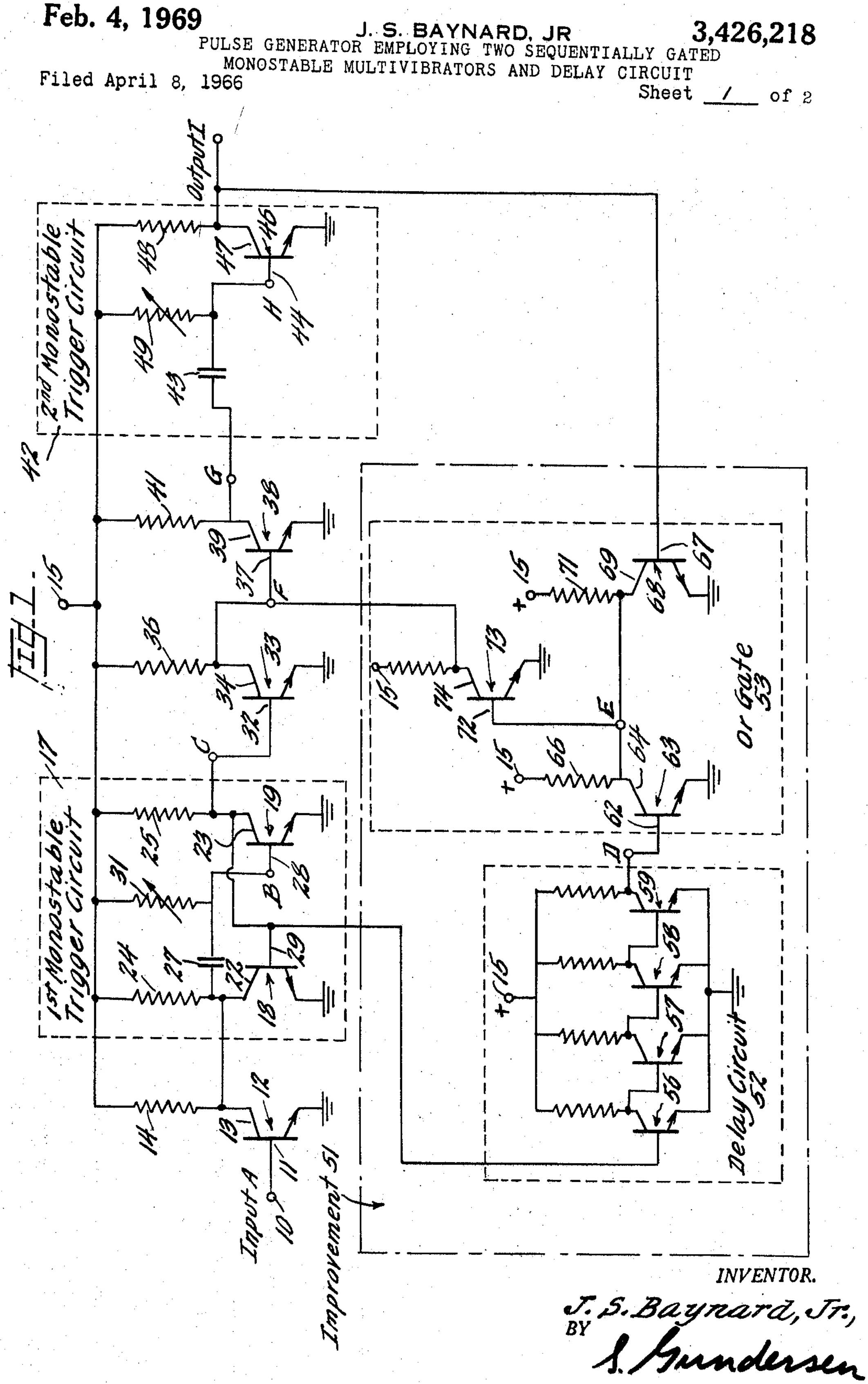
FIG. 1 is a digram of a circuit embodying the invention.

Referring first to FIG. 1, an input 10 is connected to a base 11 of a grounded emitter-transistor 12. The collector 13 of the transistor 12 is connected to the input of a monostable trigger circuit or multivibrator 17 and to a voltage source 15 by a resistor 14. The trigger circuit 17 has a normally nonconductive grounded emitter-transistor 18 and a normally conductive grounded emitter-transistor 19 with their respective collectors 22 and 23 connected by respective resistors 24 and 25 to the voltage source 15.

A capacitor 27 couples the collector 22 of the transistor 18 to a base 28 of the transistor 19. The collector 23 of the transistor 19 is connected to the base 29 of the transistor 18. A variable resistor 31 couples the voltage source 15 to the base 28 to normally supply a voltage to the base 28 to render the transistor 19 conductive.

Figure 2:
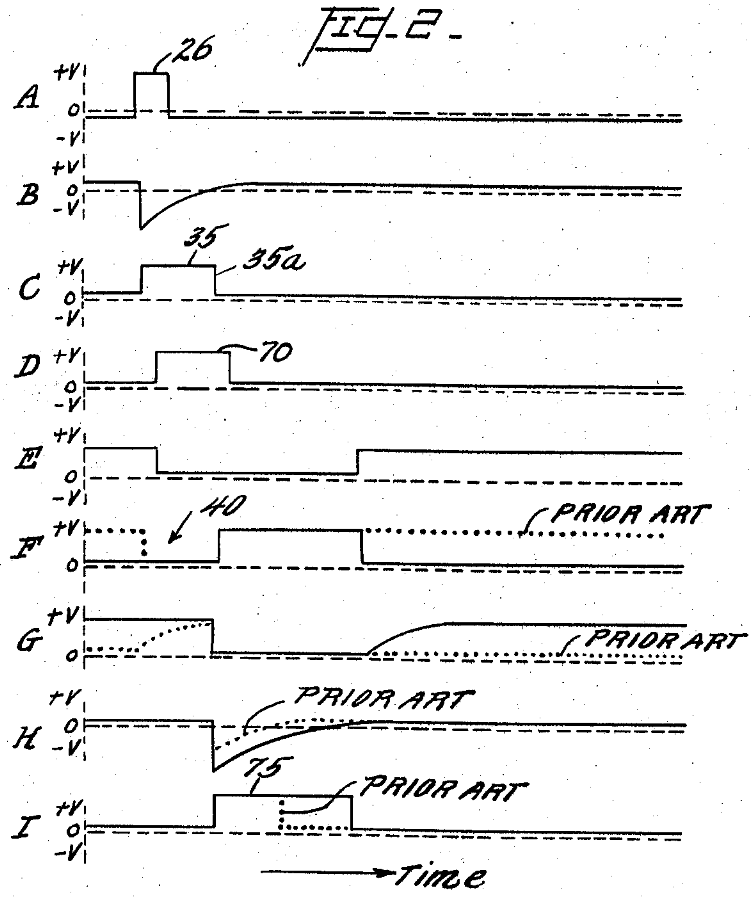
FIG. 2 is a chart showing the voltages appearing at lettered points of the circuit shown in FIG. 1.

When a positive pulse 26 (see waveform A in FIG. 2) is applied to the input 10, a negative pulse is produced on the collector 13. The negative pulse is transmitted through the capacitor 27 to the base 28 of the transistor 19 (see waveform B in FIG. 2) to render the transistor 19 nonconductive and to trigger the trigger circuit 17 into its excited state wherein the transistor 18 is conductive and the transistor 19 is nonconductive. After a duration of time determined by the time constant of the capacitor 27 and the variable resistor 31, current flow from the voltage source 15 charges the capacitor 27 to increase the voltage on the base 28 (see waveform B in FIG. 2); thus, the transistor 19 is rendered conductive and the trigger circuit 17 returns to its normal state with transistor 18 nonconductive and transistor 19 conductive. During the excitation time of the trigger circuit 17, a positive pulse 35 (see waveform C in FIG. 2) is produced on the collector 23.

The collector 23 is connected to a base 32 of a grounded emitter-transistor 33. A colletcor 34 of the transistor 33 is connected by a resistor 36 to the voltage source 15. When the trigger circuit 17 is in its normal state, the transistor 33 is rendered nonconductive by the voltage on the collector 23; but during the output pulse 35 of the first trigger circuit 17, the transistor 33 is rendered conductive.

The collector 34 of the transistor 33 is connected to a base 37 of a grounded emitter-transistor 38. The collector 39 of the transistor 38 is connected to the input of a second monostable trigger circuit 42 and to the voltage source 15 by a resistor 41. In the second trigger circuit 42, a capacitor 43 couples the input to a base 44 of a grounded emitter-transistor 46. The collector 47 of the transistor 46 is connected by a resistor 48 to the voltage source 15. A variable resistor 49 couples the voltage source 15 to the base 44 to normally render the transistor 46 conductive.

Without the improvement 51, shown within the broken line of FIG. 1, the positive pulse 35 produced on the collector 23 of the first monostable trigger circuit 17 would produce a negative pulse 40 (see dotted line in waveform F in FIG. 2) on the collector 34 to render the transistor 38 nonconductive. The capacitor 43 would charge during the application of the pulse 40 (see dotted line in waveform G in FIG 2) and thus on the trailing edges of the pulses 35 and 40 the transistor 38 would become conductive to apply a negative voltage (see waveform H in FIG. 2) to the base 44 from the capacitor 43 to render the transistor 46 nonconductive. In the absence of the improvement 51, the magnitude of the negative pulse 75 would also be shortened (see dotted line in waveform H in FIG. 2) by the trailing edge 35*a* of the pulse 35 depends upon the time duration of the pulses 35 and 40. Thus, if the resistor 31 is adjusted to change the duration of delay between the input pulse 26 and an output pulse 75 to a shorter duration, the length of the output pulse 75 would also be shortened (see dotted line in waveform I in FIG. 2). For very short pulses 35 from the first monostable trigger circuit 17, the capacitor 43 does not charge sufficiently during the pulse to trigger the second trigger circuit 42 on the trailing edge of the pulse 35.

The improvement 51 supplies a voltage to the base 37 of transistor 38 (see solid line in waveform F in FIG. 2) to render the transistor 38 nonconductive prior to the pulse 35 to apply a positive voltage to the capacitor 43 (see solid line in waveform G in FIG. 2) to precharge the capacitor 43. By precharging the capacitor 43, the second trigger circuit 42 is made independent of the duration of the pulse from trigger circuit 17. Also, the second trigger circuit 42 is triggered by pulses 35 which are of insufficient duration to charge the capacitor 43.

A delay circuit 52 having four serially connected grounded emitter-transistors 56, 57, 58 and 59 couples the collector 23 to a first input of an OR gate 53. The output of the second trigger circuit 42 is connected to a second input of the OR gate 53. The first and second inputs of the OR gate 53 are connected to respective bases 62 and 67 of grounded emitter-transistors 63 and 68. The collectors 64 and 69 of the transistors 63 and 68 are connected by respective resistors 66 and 71 to the voltage source 15. The collectors 64 and 69 are both connected to a base 72 of a grounded emitter-transistor 73 which has a collector 74 connected to the base 37 of the transistor 38 and to the voltage source 15 by a resistor 76.

In the absence of output pulses on both the collectors 23 and 47, the transistors 63 and 68 are both nonconductive (see waveform E in FIG. 2) and the transistor 73 is conductive to render the transistor 38 nonconductive. By rendering the transistor 38 nonconductive, a positive voltage produced on the collector 39 precharges the capacitor 43.

When a pulse 35 is produced on the collector 23, a slightly delayed pulse 70 (see waveform D in FIG. 2) is applied by the delay circuit 52 to the base 62 of the transistor 63 to render the transistor 63 conductive; thus, the transistor 73 is rendered nonconductive. Similarly, when an output pulse 75 (see solid line in wave form I in FIG. 2) is produced by the collector 47, the transistor 68 is rendered conductive to render the transistor 73 nonconductive. The pulse 70 is delayed sufficiently by the delay circuit 52 to overlap the leading edge of the output pulse 75. The transistor 73 remains nonconductive when the trailing edge 35*a* of the pulse 35 renders the transistor 33 nonconductive to render the transistor 38 conductive to apply a negative voltage to the base 44 of the transistor 46 (see solid line in waveform G and H in FIG. 2) to excite the trigger circuit 42. After the output pulse 75, the transistor 73 becomes conductive to render the transistor 38 nonconductive to precharge the capacitor 43 in preparation for another input pulse 26.

Figure 3:
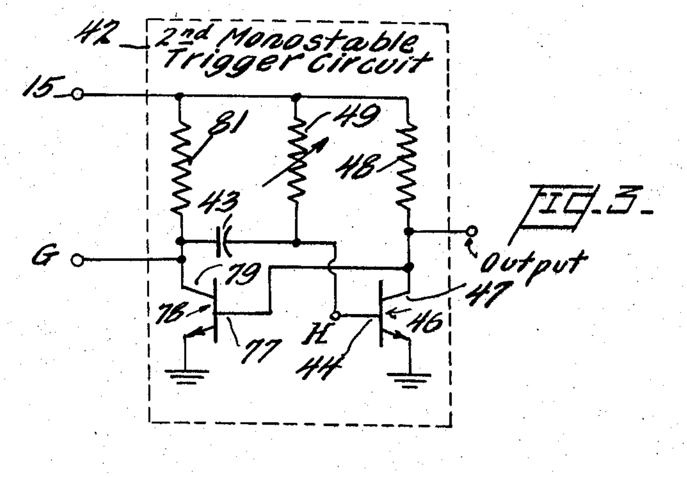
FIG. 3 is a diagram of an alternate circuit for the second monostable trigger circuit of FIG. 1.

Alternately, a transistor 78 may be added to the monostable trigger circuit 42 to form a monostable multivibrator, as shown in FIG. 3. A base 77 of a grounded emitter-transistor 78 is connected to the collector 47 of the transistor 46. The collector 79 of the transistor 78 is connected by a resistor 81 to the voltage source 15. The capacitor 43 couples the collector 79 to the base 44 of the transistor 46 to provide a positive feedback to more rapidly switch the trigger circuit 42.

It is to be understood that the above-described circuits are simply illustrative of an application of the principles of the invention and many other modifications may be made without departing from the scope of the invention.

What is claimed is:

1. A pulse generator circuit comprising:
a first monostable trigger circuit;
a second monostable trigger circuit having a resistance and a capacitance for controlling the excitation time thereof;
means coupling the output of the first trigger circuit to the input of the second trigger circuit for applying an output pulse of the first trigger circuit to the capacitor in the second trigger circuit to trigger the second trigger circuit in response to the trailing edge of the output pulse of the first trigger circuit;
means for precharging the capacitance prior to the output pulse of the first trigger circuit isolating the first and second trigger circuits from each other; and
delay means connected in parallel to the coupling means to open the isolation means in response to a delayed leading edge of the output pulse of the first monostable trigger circuit.

2. A pulse generator as defined in claim 1 wherein:
means connect the output of the second trigger circuit to the precharging circuit for initiating the precharging of the capacitance after the output pulse of the second trigger circuit.

3. A delay pulse generator circuit comprising:
a first monostable trigger circuit for producing a first pulse:
a second monostable trigger circuit having a resistance and a capacitance wherein the capacitance is charged when a first voltage is applied to the input of the second trigger circuit, and the second trigger circuit is excited to produce a second pulse when a second voltage is applied to the input of the second trigger circuit, said second trigger circuit remaining excited for a duration dependent upon the discharge of the capacitance;
charging means having a first state for applying the first voltage to the input of the second trigger circuit and having a second state for applying the second voltage to the input of the second trigger circuit;
coupling means between the first trigger circuit and the charging means for applying the first pulse to the charging means such that the charging means is switched from the first to the second state on the trailing edge of the first pulse;
means connected to the first trigger circuit for delaying the first pulse; and
means connected to the delay means, the second trigger circuit and the charging means for normally maintaining the charging means in the first state but responsive to the delayed first pulse and the second pulse for allowing the charging means to be switched to the second state.

References Cited

UNITED STATES PATENTS

| | | | |
|---|---|---|---|
| 3,085,165 | 4/1963 | Schaffert et al. | 307—88.5 |
| 3,223,856 | 12/1965 | Joy | 307—88.5 |
| 3,244,909 | 4/1966 | Henderson | 307—88.5 |

JOHN S. HEYMAN, *Primary Examiner.*

U.S. Cl. X.R.

307—273; 328—66, 58